May 6, 1969 E. E. HARDY 3,443,007
PROCESS FOR PRODUCING A SMOOTH IMPERVIOUS SKIN ON THE SURFACE
OF A RESILIENT SHEET OF FOAMED PLASTIC
Original Filed May 29, 1956
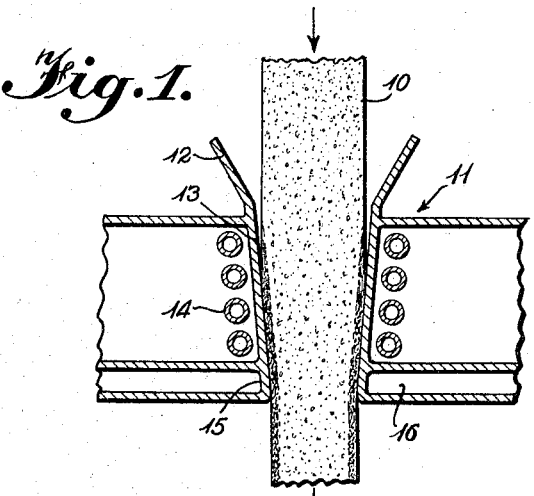
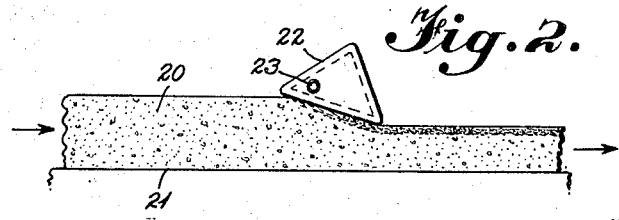
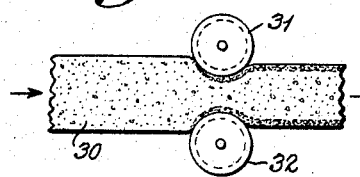
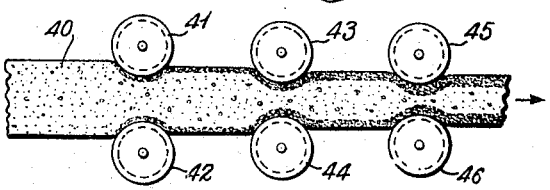
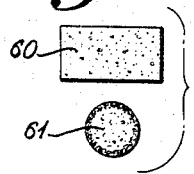
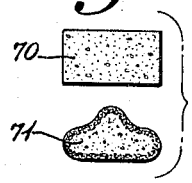
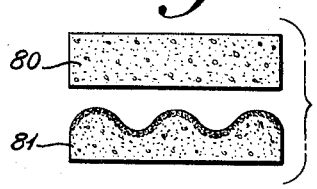
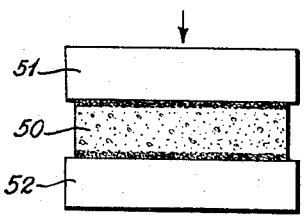
INVENTOR
Edgar E. Hardy
BY Stevens, Davis, Miller and Mosher
ATTORNEY

NATURAL SKIN    CROSS SECTION (56X)

Fig. 9ª
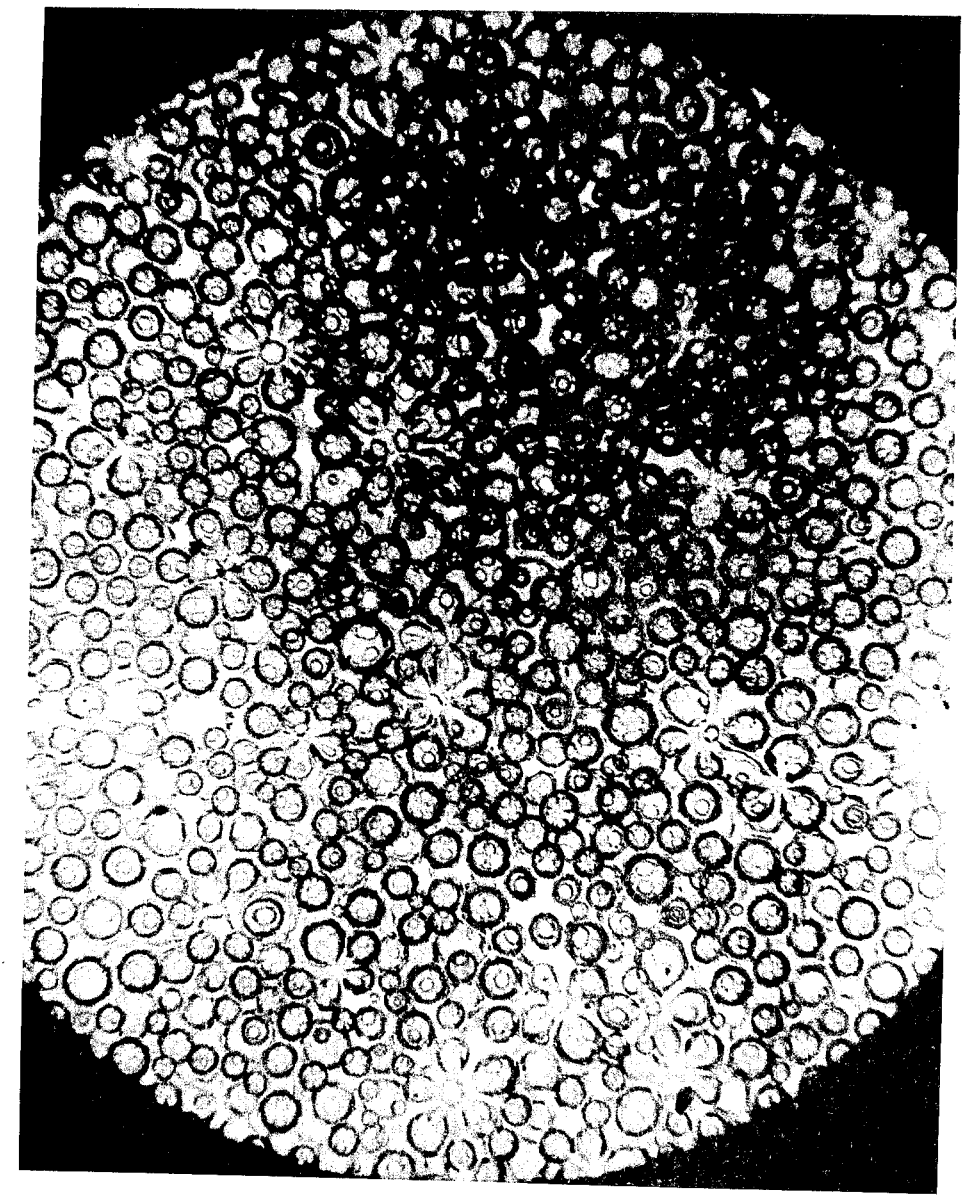
NATURAL SKIN     TOP PLAN (56X)

HOT PRESS METHOD   CROSS SECTION (55X)

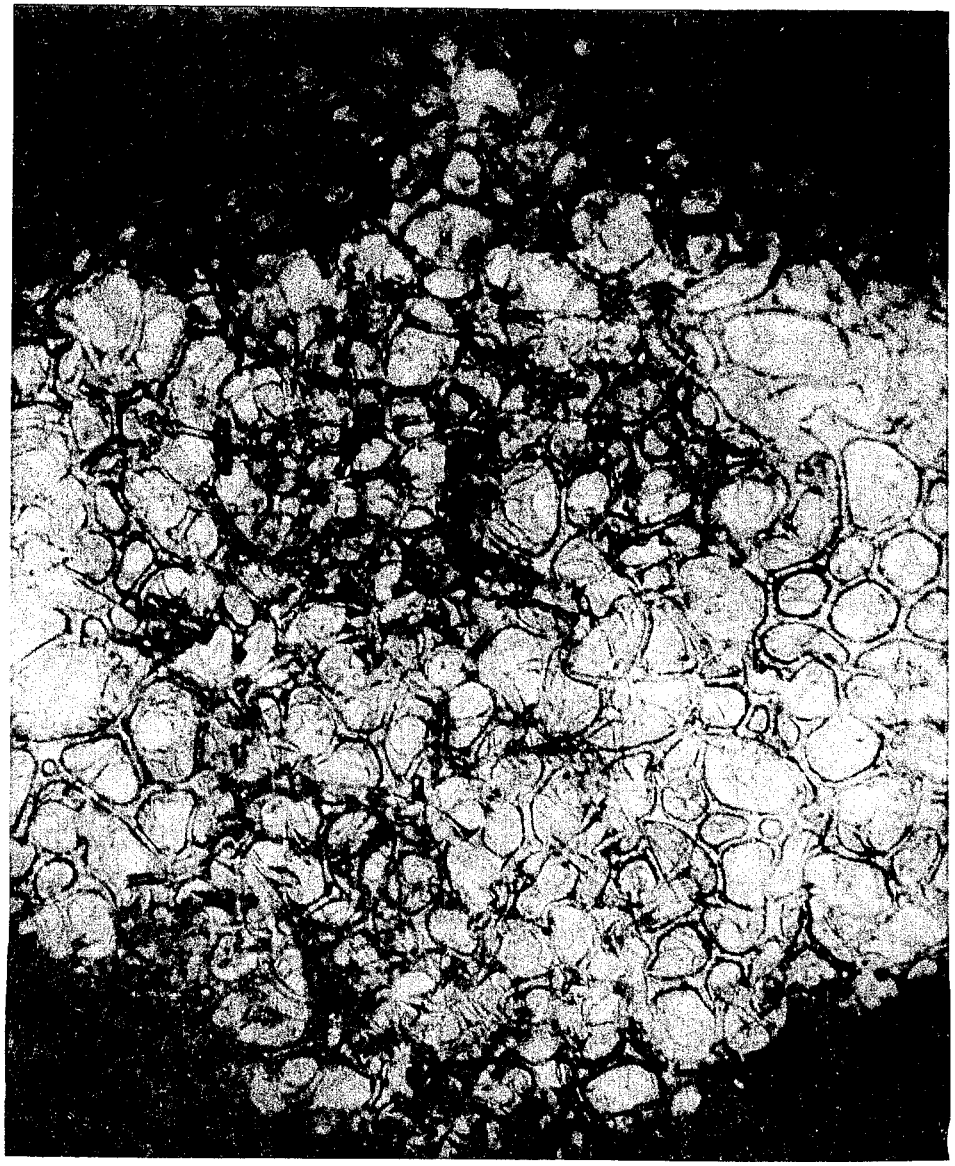
Fig. 10ª
HOT PRESS METHOD   TOP PLAN (56X)

CALENDER METHOD    CROSS SECTION (56X)

CALENDER METHOD  TOP PLAN (56X)

HOT KNIFE METHOD   CROSS SECTION (56X)

Fig. 12ᵃ
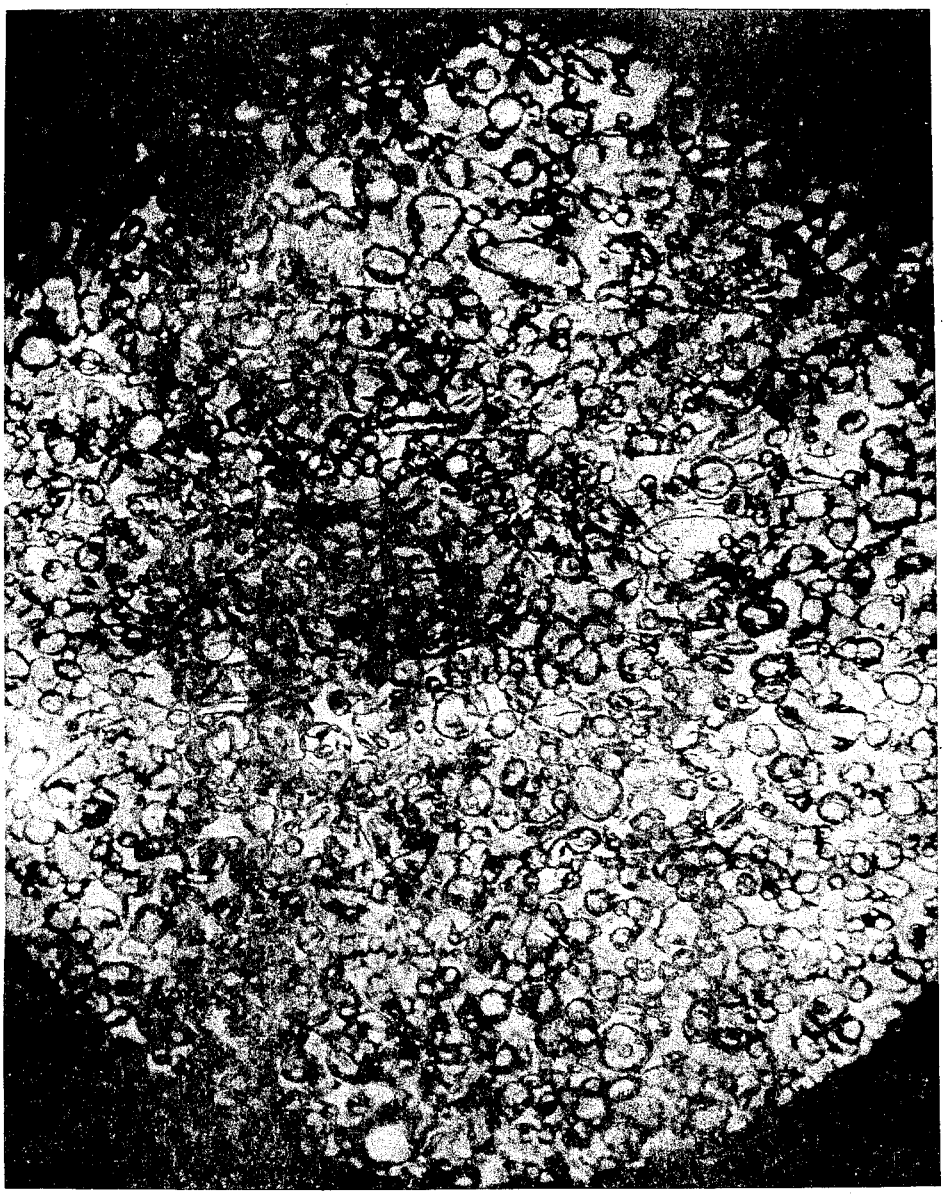
HOT KNIFE METHOD   TOP PLAN (56X)

United States Patent Office 3,443,007
Patented May 6, 1969

3,443,007
PROCESS FOR PRODUCING A SMOOTH IMPERVIOUS SKIN ON THE SURFACE OF A RESILIENT SHEET OF FOAMED PLASTIC
Edgar E. Hardy, New Martinsville, W. Va., assignor to Mobay Chemical Company, St. Louis, Mo., a corporation of Delaware
Continuation of application Ser. No. 588,053, May 29, 1956. This application Feb. 21, 1967, Ser. No. 617,718
Int. Cl. B29d 27/00, 9/02
U.S. Cl. 264—321
6 Claims

ABSTRACT OF THE DISCLOSURE

A dense after-formed skin of substantial thickness is produced on at least one surface of a cured preformed polyurethane foam by subjecting the surface thereof to pressure and elevated temperatures as defined hereinafter by contact with a heated metal surface or a plurality of pairs of heated metal rollers or differentially driven rollers with a wiping action.

This application is a continuation of my copending application Ser. No. 588,053, filed May 29, 1956, and now abandoned. See also my copending application Ser. No. 329,850, filed Dec. 11, 1963, and now abandoned.

This invention relates to the manufacture of polyurethane foams which have been treated in such manner as to produce thereon a substantially uniform dense surface or skin. More particularly, the invention relates to the manufacture of a polyurethane foam structure, preferably but not necessarily of the open-pore type, that has been treated in such manner as to produce thereon a smooth continuous densified surface skin extending over at least a substantial portion of at least one surface thereof, the original polyurethane foam structure (prior to treatment in accordance with the invention) comprising a shaped, pre-formed, cured polyurethane foam. Still more particularly, the invention relates to the manufacture of a polyurethane foam which has been treated in such manner as to produce thereon a dense skin which is characterized by unusually desirable properties, such as good resistance to scratching and abrasion, the ability to receive coating compositions of various kinds either for decorative or protective purposes, as well as certain other desirable properties as will appear more fully hereinafter.

It has previously been proposed to apply coating compositions comprising various synthetic resins to polyurethane foam for the purpose of providing the foam with an impervious surface, with particular reference to rendering the resulting polyurethane foam structure impervious or substantially impervious to water. However, the application of a synthetic resin coating composition to a plastic foam is time-consuming and inconvenient to carry out, besides requiring the use of additional chemicals thereby contributing to the heterogeneity of the system and increasing the cost of the final product. Perhaps even more seriously, however, in attempting so to coat polyurethane foam, the essential pore structure of the surface of the foam is not effectively hidden or done away with and consequently only an unattractive and commercially undesirable rough surface pattern can be obtained when polyurethane foam is coated with other materials such as polyurethane coating compositions, water-soluble paints, vinyl resin paints, etc.

It is therefore an object of the present invention to overcome these and other difficulties by manufacturing a polyurethane foam, and shaped articles of polyurethane foam, having a skin of greatly increased density as compared to the density of the substructure thereof. Another object of the invention is to manufacture a shaped article of polyurethane foam having a greatly reinforced surface which exhibits a markedly improved resistance to abrasion and scratching. A further object of the invention is to manufacture polyurethane foam and articles of polyurethane foam having a relatively dense skin to which decorative and/or protective coatings may be readily, easily and effectively applied. A further object of the invention is to provide an efficient, economical and commercially practicable process for manufacturing sealed cured polyurethane foam structures from open-pore cured polyurethane foam, said sealed cured polyurethane foam structures being characterized by the tough relatively dense skin overlying the substrate of substantially unaltered cured polyurethane foam.

The manner in which the foregoing and other objects of the invention are attained will become apparent from the following description of the invention, which is intended to be illustrative rather than limitative.

According to the present invention, it has been discovered that the objects set forth above may be accomplished by subjecting at least substantially an entire surface of shaped, cured polyurethane foam to elevated temperatures and pressures. More specifically, the process involves the feature of subjecting the surface of the cured polyurethane foam to be sealed, i.e. to be provided with a dense skin in accordance with the objects of the invention, to elevated temperatures below those at which appreciable chemical decomposition of the polyurethane occurs but sufficiently high as to permit viscous or plastic flow of the polyurethane foam in the surface layer, while subjecting the polyurethane foam thus heated to pressure sufficient to consolidate and densify the at least incipiently melting foam material in the surface layer, thereby leading to the production of a relatively more dense skin on the main body of polyurethane foam material which skin may or may not retain a pore structure.

By the expression "cured," as applied to the polyurethane foam treated in accordance with the present invention, is meant that the polyurethane foam has had time to set or reach its maximum volume after the original production thereof so that it is self-supporting and can be handled and readily subjected to further shaping operations such as cutting, sawing, bending, etc.

It is a matter of surprise that polyurethane foam can be provided with a relatively dense skin in accordance with the present invention by subjecting its surface to pressure and elevated temperatures, since polyurethane foam is not generally regarded in the art as having thermoplastic properties. In fact, these cured polyurethane foams are actually in the nature of certain synthetic rubbers such as GR–S which cannot be treated as described herein. The cured polyurethane foams that constitute the starting material in accordance with the present invention are also known to decompose quite readily under the influence of heat. Another reason why the results obtainable by the present invention were by no means to have been expected is the inherently porous structure of polyurethane foam which makes is difficult to heat portions of foam lying immediately below the uppermost surface layer to the required temperatures without overheating and actually decomposing the polyurethane material of the uppermost surface layer itself.

The dense skin structure which is characteristic of the present invention is incorporated or produced on the cured polyurethane foam structure by subjecting same to a combined pressure and heat treatment involving the application of both heat and at least some pressure to the foam for a predetermined length of time. However, the conditions of treatment are somewhat interrelated in the sense that for a given pressure higher temperatures can be employed for a correspondingly shorter time, and conversely. Similarly for a given temperature of treatment, the pressures that may be employed vary, roughly speaking, inversely with the time. Finally, for a given time of treatment, the applied pressures vary roughly in an inverse manner with the time of treatment. Finally, the schedule of appropriate pressures, temperatures and time of treatment will vary not only in accordance with the particular manner in which the treatment is carried out, as will be more fully described hereinafter, but also these conditions will depend, to some extent at least, upon the particular polyurethane foam undergoing treatment and the manner in which the treatment is carried out, as well as upon the thickness of the skin desired in the final product.

It should be understood that the present invention is not directly concerned with the chemistry of the polyurethane foams, it being pointed out that a rather substantial literature has evolved since World War II dealing with the manufacture of polyurethane foams of all types, including flexible, semi-rigid, and rigid polyurethane foams. It is obviously impossible to lay down in advance with absolute accuracy a treatment schedule that can be expected to be applicable without change to each and every one of the many polyurethane foam formulations that are known at present or which will be developed in the future as broadly equivalent polyurethane foams, but those skilled in the art will have no difficulty in making any slight modifications that may be necessary or desirable in dealing with any particular cured polyurethane foam starting material to which the invention is to be applied, once they have become familiar with the description herein.

In the case of most cured polyurethane foams, the process may be carried out at temperatures from as low as about 120° C. to temperatures as high as about 1000° C., although ordinarily it will be preferred not to exceed about 500° C. Excellent results are obtained at temperatures varying from about 150° C. to about 480° C., with certain other ranges of temperatures to be set forth more fully hereinafter being still more preferred, depending in part upon the manner in which the process is carried out.

The time of heat treatment may be varied from as low as about 0.1 second to relatively long times of the order of about five minutes or even more. Excellent results are obtained when the time of treatment varies from about 5 to about 180 seconds, although a still more preferred time of treatment is from about 10 to about 20 seconds. It will be understood that, as indicated above, the times of treatment and the temperatures are interrelated in an inverse sense, i.e., as the temperature of treatment is increased the corresponding time of treatment is decreased in order to prevent the danger of decomposing the polyurethane in the outermost surface layer of the foam.

In any case, the treatment conditions may be varied over rather wide ranges depending upon such diverse factors as the nature of the final product desired, the composition of the particular polyurethane foam undergoing treatment, and the type of treatment employed.

The pressures to be employed may vary over rather wide ranges, depending in part upon the manner in which the pressure is applied. For example, the pressure may be as low as 0.2 lb. per sq. in. where the treatment is by means of a hot knife or blade, and may range upwardly as high as about 1000 lbs. per sq. in. where the treatment takes place in a mold or press with the polyurethane foam disposed between heated platens. Excellent results are obtained in the range of about 0.5 to about 400 lbs. per sq. in., while a still more preferred range of pressure is about 10 to about 200 lbs. per sq. in.

When the treatment is carried out by passing the cured polyurethane foam starting material between pairs of pressure rolls, the applied pressure may be conveniently expressed in terms of the percentage of compression of the foam material passing through the nip of the rolls. Under these circumstances the compression may be of the order of from about 50 to about 99%, with about 80 to about 99% compression generally giving very satisfactory results. Generally, however, it is preferred to operate near the upper end of this range of compressions, i.e., from about 95 to about 98%. With this type of treatment, the time of treatment may also be expressed somewhat differently, namely, in terms of the relative rate of movement between the polyurethane foam undergoing treatment and the pressure rolls. Under these circumstances, rates of from about ½ to about 50 feet per minute are satisfactory, although generally it will be preferred not to exceed a rate of about 20 feet per minute. Rates varying from about 1 to about 6 feet per minute of movement of the polyurethane foam past the heated rolls are still more preferred.

When employing the treatment involving passing the polyurethane foam starting material between heated pressure rolls, it will be noted that the time of treatment will be relatively short so that correspondingly the temperatures and pressures may be relatively high. On the other hand, when what may be termed a "wiping" technique such as is obtained by employing a hot knife or blade under pressure (as hereinafter more fully described) the applied pressures may be relatively quite low, and in fact so low that only a small mass of material in the uppermost layer of the cured polyurethane foam structure being treated is in effect being spread out ahead of the knife or doctor blade in which case the temperatures and times of treatment may be relatively high. In the latter case, and expressing the time of treatment in terms of rates of movement of the polyurethane foam past the hot knife or blade, these rates may vary from about ½ to about 200 feet per minute, although generally about 100 feet per minute will not be exceeded in most cases. Rates of from about 1 or 2 feet per minute up to about 20 feet per minute are still more particularly preferred.

With all types of treatment, however, the density of the initial cured polyurethane foam undergoing treatment will have considerable bearing on the optimum conditions to be employed in that the more dense the initial foam, i.e., the smaller the pore structure, the greater will be the mass of polyurethane per unit volume near the surface which is converted by the process of the present invention into the desired dense skin in which the pore structure is still smaller than in the initial foam—and in some cases even substantially entirely eliminated. Thus the less dense the initial cured polyurethane foam undergoing treatment, the more deeply must the heat treatment penetrate the body of the polyurethane foam structure to produce therefrom the desired thickness of skin that results in the composite cured polyurethane foam product having the required dense skin thereon. In addition, the optimum temperature and other conditions of treatment will depend in part upon the thickness of the skin desired; for example, the higher the temperatures applied to a given cured polyurethane foam surface, the thicker will be the skin developed, other conditions remaining the same, and conversely.

In order to still further illustrate the present invention, reference is made to the accompanying drawings showing in somewhat schematic form by means of partial cross-sectional views in elevation various procedures embodying the salient features of the present invention, together with photomicrographs showing the comparative results obtained when operating in accordance therewith.

FIG. 1 illustrates one embodiment of the invention wherein a cured polyurethane foam is passed through a heated die for the purpose of producing the dense skin of the present invention thereon;

FIG. 2 illustrates an embodiment wherein a sheet or slab of cured polyurethane foam, supported on a suitable plane surface, is passed through a slit defined by said plane surface and a heated knife or doctor blade;

FIG. 3 illustrates another embodiment in which cured polyurethane foam is passed through the nip between two wheels or rollers which are suitably heated and which are spaced apart from each other in such manner that the polyurethane foam is rather highly compressed during the course of the treatment;

FIG. 4 illustrates an embodiment somewhat similar to FIG. 3 in which a plurality, here three, of pairs of heated wheels or rollers are employed, with the spacing between successive pairs of wheels or rollers being successively diminished in the direction of movement of the heated polyurethane foam;

FIG. 5 illustrates another embodiment in which a block of cured polyurethane foam is disposed between the heated platens of a press while a predetermined force is applied to the press in order to compress the polyurethane foam while undergoing treatment;

Figure 9:
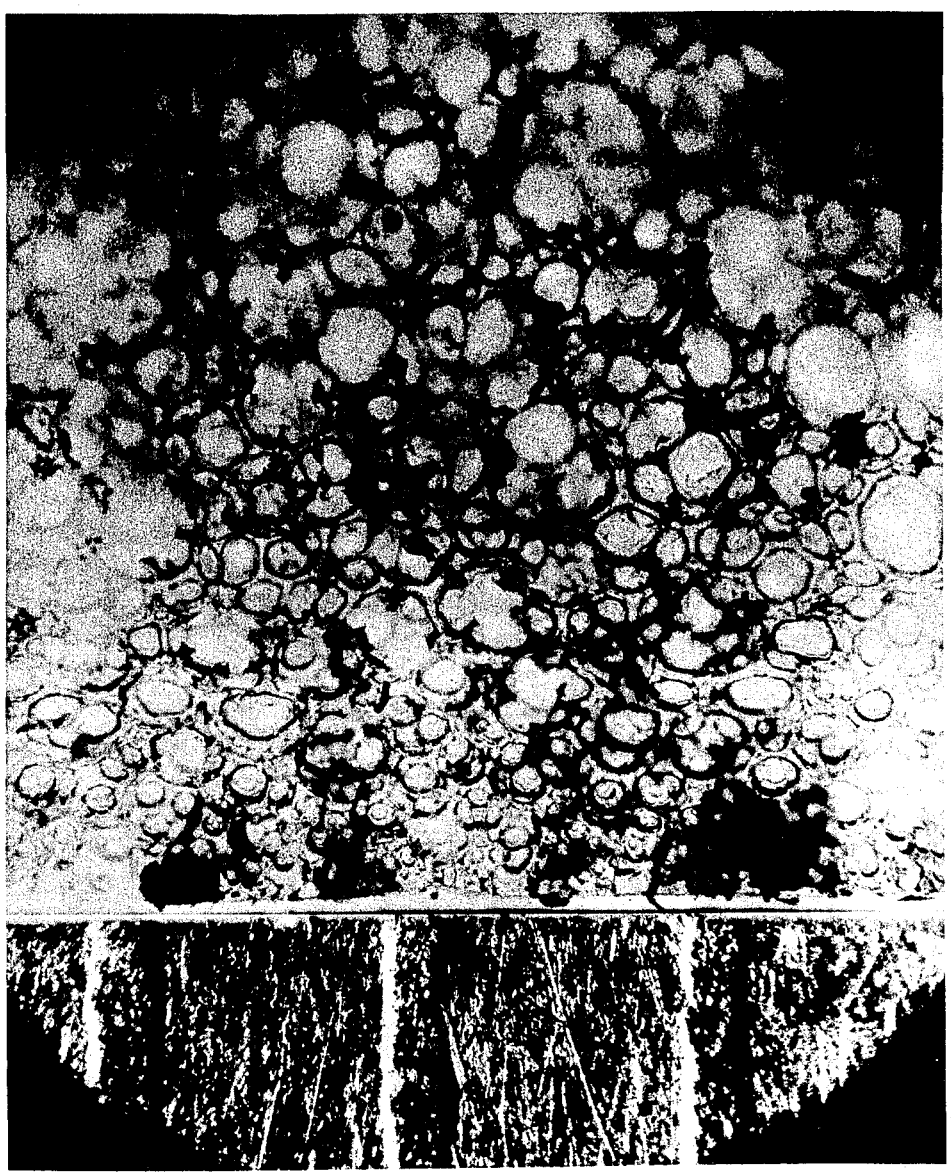
Figure 10:
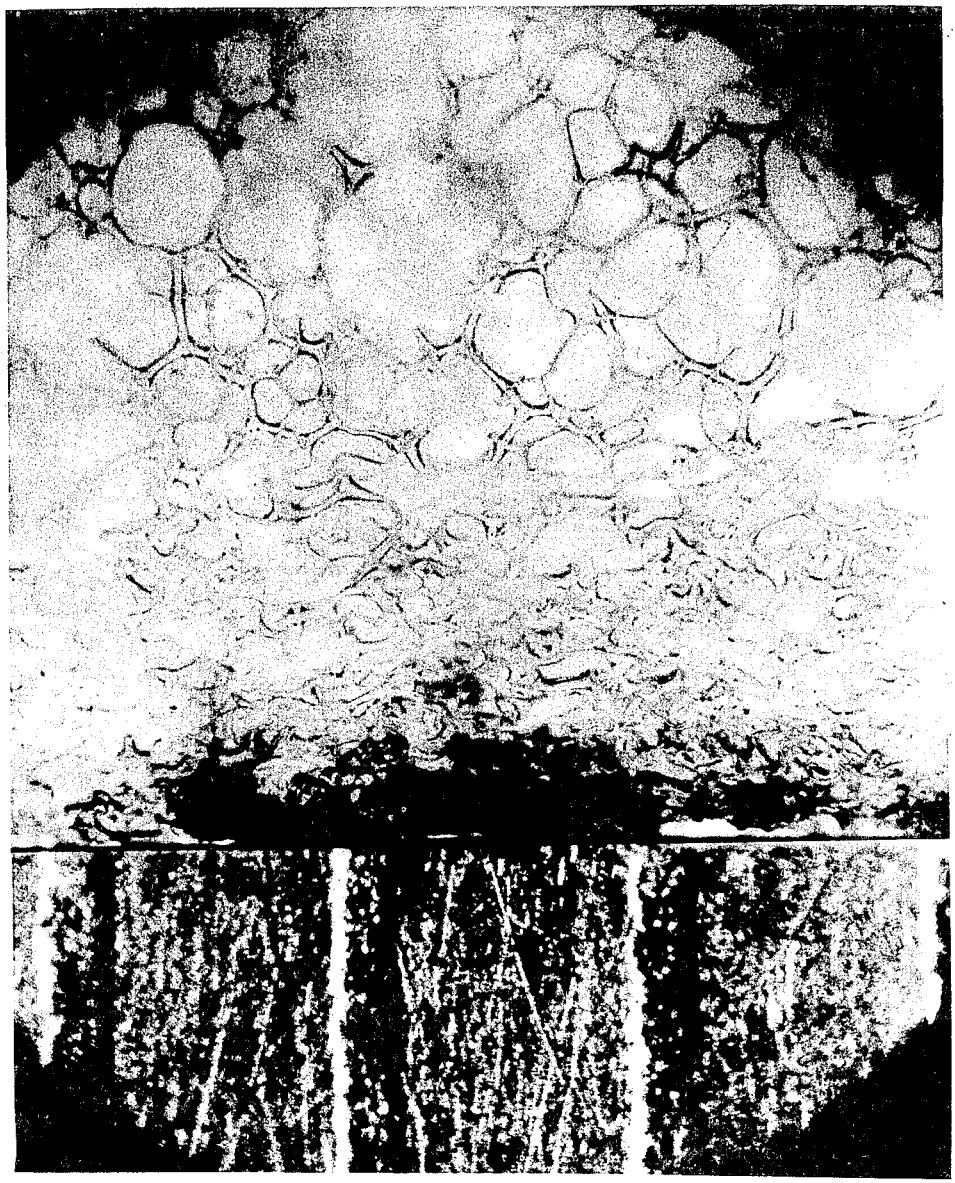
Figure 11:
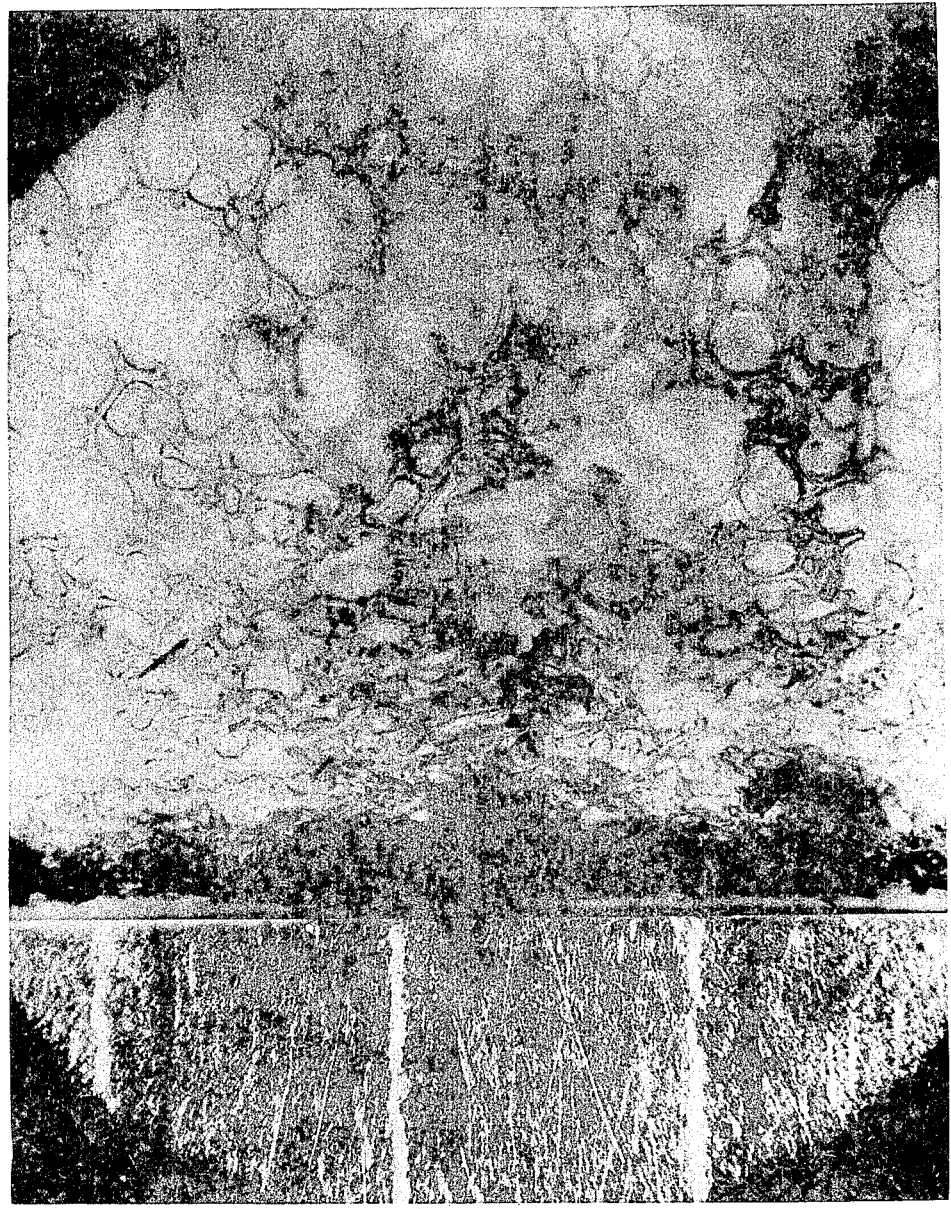
Figure 11:
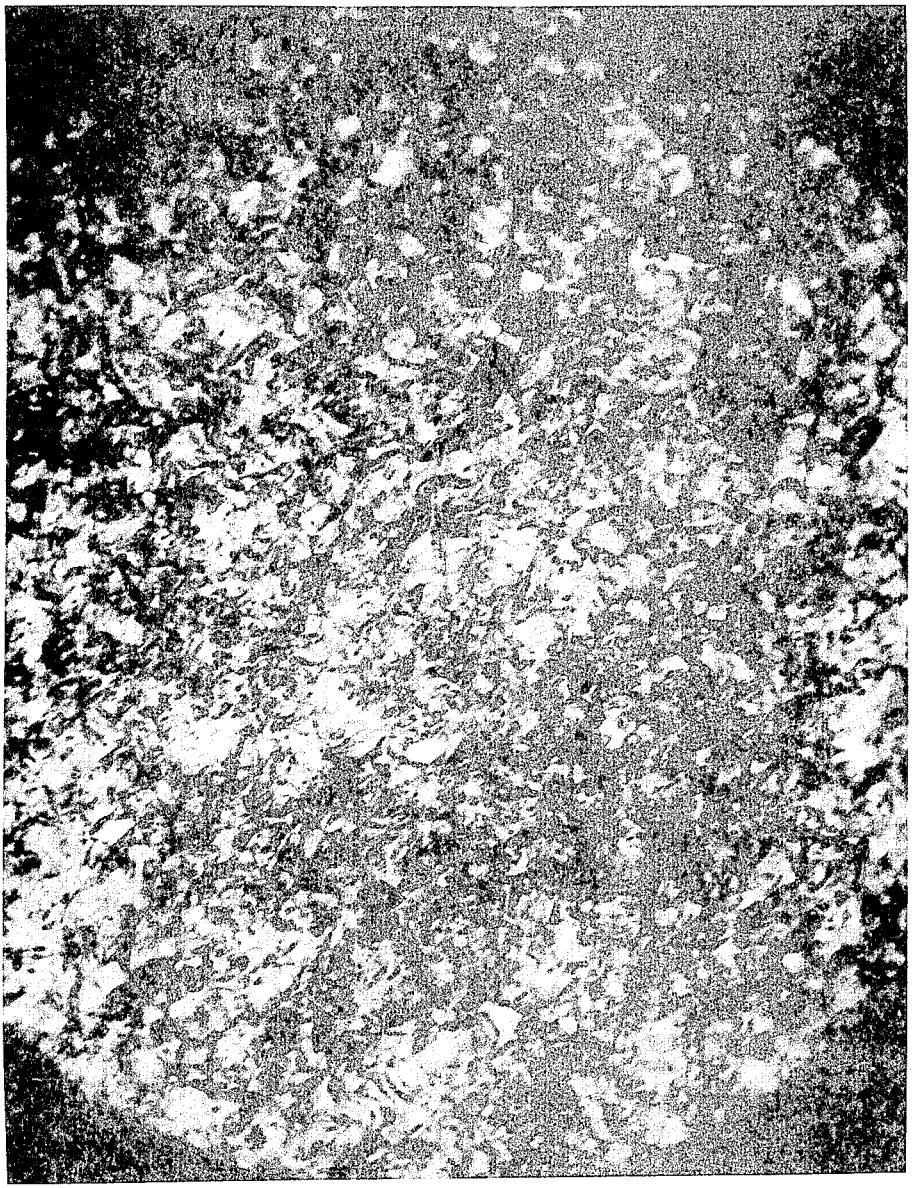
Figure 12:
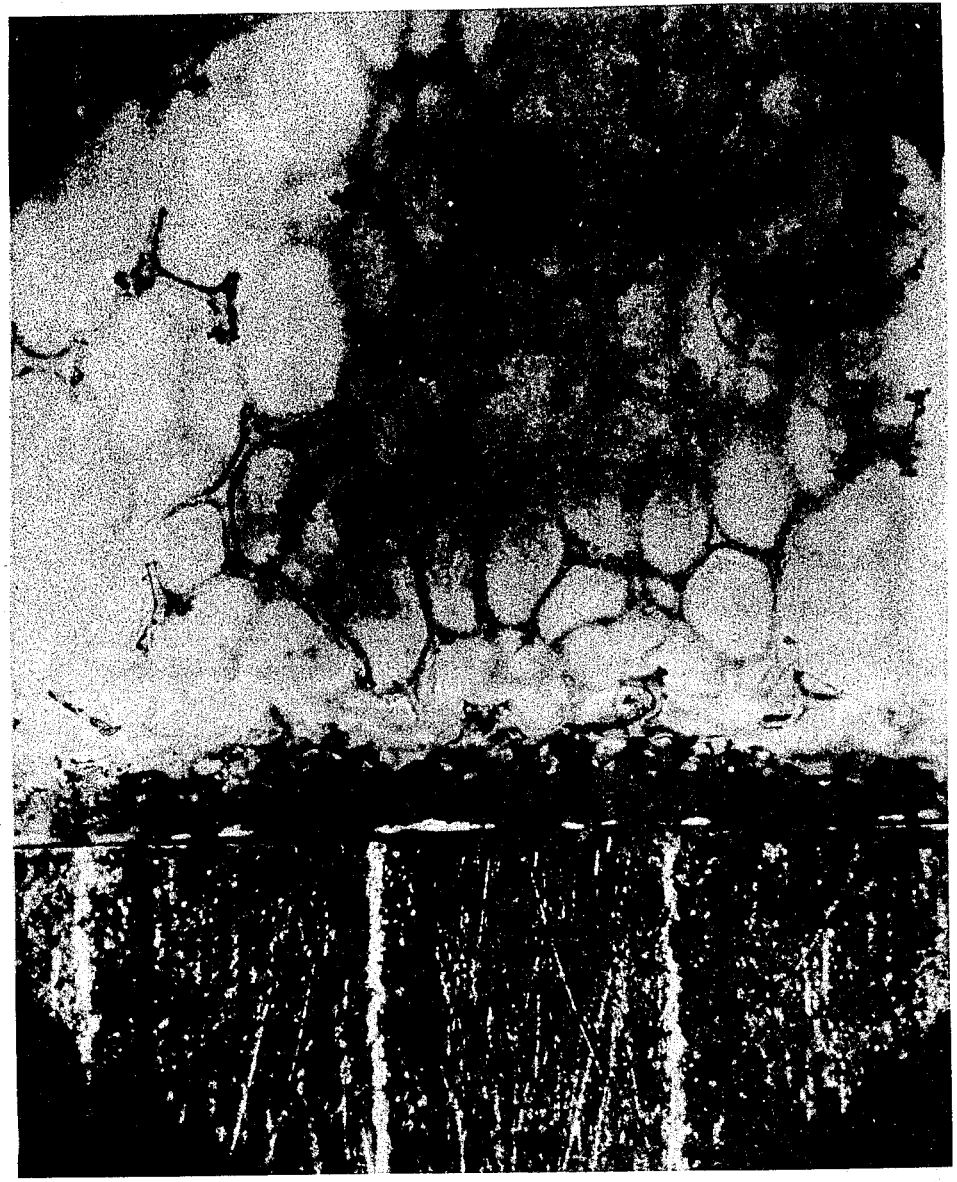

FIGS. 6, 7 and 8 disclose still another desirable feature of the present invention wherein a shaped mass such as an elongated strip of cured polyurethane foam having a given cross-section, as shown in the upper portion of each of these figures, is passed through a suitably shaped heated forming device, which may be a heated die or pairs of heated wheels or rollers which are suitably grooved or otherwise contoured, whereby the resulting sealed cured polyurethane foam having a dense skin thereon is given any desired predetermined shape during the actual skin-forming operation; and FIGS. 9, 9a, 10, 10a, 11, 11a and 12, 12a are photomicrographs showing in cross-section and in top plan view, respectively, fine details of (a) the structure of the natural skin which forms on a free-rise polyurethane foam at the time of its initial preparation from the fluid ingredients from which it is made and while it is setting or curing, (b) the structure of a dense skin prepared by the press method of the present invention such as is shown in FIG. 5, (c) the structure of the dense skin that is formed by the roll or calender method such as is shown in FIGS. 3 and 4, and (d) the structure of the dense skin that is formed by the hot knife method such as is shown in FIG. 2.

Referring now in greater detail to these various figures, in FIG. 1 the cured polyurethane foam 10 is passed into the throat of a heated die having inwardly tapering side walls and indicated generally by the reference numeral 11. The die comprises a throat or mouth 12 of larger cross-section than the cross-section of the initial polyurethane foam material, sloping side walls 13 which serve to transmit heat to the downwardly moving polyurethane foam undergoing treatment and, by virtue of the constriction thereof, to apply compressive forces to the foam. Situated within or surrounding the die, and closely adjacent to at least the upper or inlet end of the sloping side walls 13, are suitable heating elements 14, which may take the form of electric resistance elements energized by means not shown or a pipe coil through which is circulated a suitable heating medium such as hot mineral oil, hot Dowtherm or the like. The lower or exit end 15 of the die purposely contains no heating elements closely adjacent thereto in order to insure that the exit end of the die will be maintained at a temperature somewhat lower than that prevailing within the directly heated portion of the die. If desired, a suitable cooling medium such as water may be circulated within the space 16 in contact with the lower end 15 of the die in order to insure positive cooling of the polyurethane foam after it leaves the direct heating zone.

In FIG. 2 a slab 20 of cured polyurethane foam is supported on a lower plate 21. The plate 21 and the knife or blade 22 define a slot through which the polyurethane foam 20 is passed from left to right in the direction of the arrows. The knife or blade 22 is provided with a suitable heating element 23, preferably disposed in the forward or leading edge thereof in relation to the advancing polyurethane foam. This heating element 23 may be similar to heating elements 14 of FIG. 1, and may take the form of a suitably energized electrical resistance element or a coil through which a suitable heat exchange fluid is passed.

In FIG. 3 a slab 30 of cured polyurethane foam is passed between two wheels or rollers 31 and 32. Either or both of these wheels or rollers may be heated such as by circulating therethrough a suitable heat exchange fluid such as hot oil or hot Dowtherm, thereby producing a dense skin on either or both sides of the foam slab 30 as the case may be. In the particular embodiment shown, both wheels or rollers are heated so that the dense skin of the present invention is formed on both surfaces of the polyurethane foam undergoing treatment.

In FIG. 4 a slab 40 of cured polyurethane foam is passed between successive pairs of wheels or rollers 41, 42 and 43, 44 and 45, 46. As in the case of FIG. 3 either or both of each of these pairs of wheels or rollers may be heated, depending upon whether the dense skin is to be formed on either or both surfaces of the polyurethane foam. In this modification successive pairs of wheels or rollers are disposed in such fashion that the nip between them decreases in the direction of movement of the polyurethane foam undergoing treatment. The positioning of the wheels or rollers in relation to each other in both FIGS. 3 and 4 is shown out of scale for ease of illustration, since in actual practice it is generally preferred that the wheels or rollers of each pair shall be disposed more closely together than is actually shown in these figures in order to apply greater compressive forces to the polyurethane foam undergoing treatment. Instead of locating the pairs of wheels or rollers in spaced relation to each other in the manner shown in FIG. 4, a generally similar operation may be carried out in a conventional calender (not shown) in which a train of coacting rolls is arranged in such fashion (e.g., with three vertically disposed rolls and a fourth roll disposed horizontally in relation to the topmost of the vertical rolls) that the cured polyurethane foam passes successively between pairs of rolls whereby successive pairs of rolls have one roll in common.

In FIG. 5 a slab 50 of cured polyurethane foam is placed between the platens 51 and 52 of a press and a predetermined pressure is applied thereto in a manner well known in the art. Either or both of the platens 51 and 52 may be heated by any suitable means, such as electric resistance elements or by circulating hot exchange fluid therethrough, in order to produce the desired dense skin on either or both surfaces of the polyurethane foam.

In FIG. 6 an elongated strip 60 of cured polyurethane foam is passed through a heated die (not shown) having a circular cross section, this die having a restricted throat portion such that the final elongated dense skin product 61 has a cross-sectional area considerably less than the cross-sectional area of the initial foam strip 60.

FIG. 7 shows a similar elongated cured polyurethane foam strip 70 which may be passed between two touching heated contoured wheels or rollers in which the contour is such as to impart the final dense skin product 71 a somewhat irregular shape which, merely for illustration, is as shown in this figure. A suitably shaped heated die may be used for this purpose instead, if desired.

In FIG. 8 a continuous strip 80 of cured polyurethane foam is passed between contoured wheels or rollers, or between a contoured wheel or roller and a plane surface in such fashion as to produce a final elongated sealed cured polyurethane foam strip 81 having a lesser cross-sectional area than the initial strip 80. In this case, as before, a suitably shaped heated die element may be employed, if desired. When employing heated dies to shape continuous strips or lengths of cured polyurethane foam while forming thereon a dense skin, it is a further feature of the present invention that the cross-section of the die may include re-entrant portions of somewhat irregular shape so that flexible polyurethane foams may be readily processed to yield final sealed cured polyurethane foam products ideally suited for gasketing or other uses where shaped products of highly irregular configurations are desired.

FIGS. 9, 9a, 10, 10a, 11, 11a and 12, 12a are photomicrographs illustrating the skin structure of various types of polyurethane foam, and will be discussed in greater detail hereinafter.

The heated metal surface that contacts the foam is preferably heated to a temperature which is at least slightly higher than, but which may be considerably higher than, the temperature to which the polyurethane foam surface itself is to be raised. For example, in order to produce effective dense skin-forming temperatures within the range of (say) 320° to 400° C. at the interface between the heated metal surface and the polyurethane foam surface, it will generally be necessary to heat the metal surface, such as the walls of the mold or press or die or the periphery of the roller or wheels, to temperatures ranging from 400° to 500° C. because of the relatively short dwell time of the polyurethane foam within the actual heating zone.

The process according to the present invention can be carried out very advantageously by passing the surface of the foam to be sealed over a heated metal surface with the application of only relatively slight contact pressure. This is shown, for example, in FIGS. 1 and 2 showing respectively the step of passing cured polyurethane foam through a heated, tapered die and through a slit formed between a plane metal surface and a sloping heated metal surface. In both these cases the polyurethane foam to be sealed has a cross-section that is somewhat greater than the smallest cross-section of the heated zone so that the heat and some degree of pressure are applied to the foam surface simultaneously. The pressure applied to the polyurethane foam in this manner tends to spread the flowable portion of the foam, i.e., the at least incipiently melting polyurethane foam material in the outermost layer of the mass of foam undergoing treatment, over the entire surface, this spreading action apparently being conducive to the formation of the desired smooth continuous skin of denser structure than the main mass of polyurethane foam undergoing treatment.

When carrying out the process involving moving the polyurethane foam to be sealed over or past a heated surface, it is frequently advantageous to employ a heating zone which includes a portion having a somewhat lower temperature on its exit side or side opposite the advancing foam. The temperature differential need not be great; thus, when using a heated die as the heating device as shown in FIG. 1, good results are obtained when the exit nozzle or portion of the die is such that its temperature brings the foam to a somewhat lower temperature, say for example about 25° C. cooler, than the temperature of the foam in the hottest portion of the die. This apparently has the effect of bringing about and/or promoting a kind of spreading or wiping action upon the previously heated polyurethane foam material that has reached the point of viscous or plastic flow and assists in consolidating the freshly formed dense skin on the polyurethane foam.

The type of apparatus preferably employed in the practice of the invention will depend in part upon the shape of the cured polyurethane foam to be sealed and the conditions of the process desired to be employed. When subjecting elongated polyurethane foam strips to the process of the invention, a heated die constitutes an eminently satisfactory heating device. If desired, the die may be so shaped in cross-section as to form relatively intricate cross-sectional shapes which may even have re-entrant portions therein, such as the relatively intricate shapes that are characteristic of windlacing and other gasket-like structures employed to exclude water from the interior of automobiles and to seal refrigerators and other enclosures and the like. If the final structure does not have re-entrant portions then the desired shape may be impressed upon the polyurethane foam while it is being densified by simply passing it between pairs of rollers, or between a roller and a plane surface, wherein the rollers are provided with the desired contour—for example, see FIGURES 6, 7 and 8 described above.

The process of the present invention may be applied to cured polyurethane foam having any desired shape. It can be used to produce dense skins on such simple shapes as cured polyurethane foam strips and sheets, or it can be used to produce dense skins on articles of more elaborate or complicated contours such as automobile armrests, windlacing, automobile crash pads and side panels, seat cushions, shoulder pads, lightweight insulation in the form of interlinings for cold weather garments, toys, aircraft components such as radomes, prefabricated wall panels for sound- and/or heat-insulation, etc. The process may also be applied to laminated foam products comprising one or more layers or masses of cured polyurethane foam, adhesively or otherwise tightly secured to another material which may or may not be cured polyurethane foam wherein the dense skin is applied to one or more surfaces of the cured polyurethane foam lamination or laminations.

The cured polyurethane foam having a dense skin produced thereon according to the present invention has a very substantially increased mechanical strength. For example, in tests wherein samples of cured polyurethane foam rods originally ¾" in diameter were treated in accordance with the present invention by passing same successively through progressively smaller heated dies in order to provide increasingly thick skins thereon, the following results were obtained in terms of tensile strength and elongation:

TABLE I

| Sample | Tensile strength, p.s.i. | Percent elongation |
| --- | --- | --- |
| ¾" round cured polyurethane foam, no skin | 15–20 | 105–125 |
| ⅝" round cured polyurethane foam, thin skin | 30–35 | 125–110 |
| ⁷⁄₁₆" round cured polyurethane foam, thick skin | 50–55 | 170–210 |

It will be noted from Table I that the indicated physical characteristics for the ⁷⁄₁₆" diameter foam product were substantially better than those of the intermediate ⅝" diameter foam product, which in turn were better than those of the initial ¾" diameter foam starting material.

The sealed cured polyurethane foam products obtained according to the present invention also show substantially increased wear resistance to abrasion and scratching. Furthermore, they may be provided with decorative and/or protective coatings much more easily and effectively than in the case of the initial open-pore cured polyurethane foam, the applied overcoat going on smoothly and drying or curing to a smooth commercially desirable finish over the dense skin substrate. The sealed cured polyurethane foam produced according to the present invention may have protective and/or decorative coatings applied thereto by any of the conventionally employed methods such as spraying, dipping, brushing, or die application.

By reason of their highly desirable properties such as those described above as well as others inherent therein, the sealed cured polyurethane foams of the present invention are capable of a wide variety of applications, some of which have already been mentioned. Among the principal applications for such sealed cured polyurethane foams are their use for windlacing or weather stripping and gasketing, as well as for clothing interlinings, shoe soles, boot linings, floor mats, carpet underlays where their excellent slip properties are particularly important so as not to wear the supported carpet unnecessarily, mattresses, cushions and upholstery in general, etc.

The dense skin obtained by the methods of the present invention can be varied, depending upon the conditions of treatment, from a very thin surface film overlying the cured polyurethane foam within to a relatively thick skin; but generally speaking, the smaller the cross-section of the heating zone in relation to the cross-section of the foam structure being treated therein the heavier will be the dense skin. Also the higher the temperature, the thicker will be the dense skin. However, even when employing relatively high temperatures, relatively thin dense skins can be obtained by increasing the relative rate of movement between the heated surface and the cured polyurethane foam undergoing treatment.

The dense skin produced according to the present invention is not to be confused with the skin or scum which normally may appear more or less simultaneously with the initial formation of the polyurethane foam from the initial ingredients thereof when they are commingled in fluid (e.g., syrupy) form either by casting or molding methods, since that skin or scum forms in an entirely uncontrolled and uncontrollable manner, is non-uniform, and in fact is a wholly undesired byproduct of the initial polyurethane foam-forming operation roughly analogous to the scale or oxide slag inevitably formed during certain well-known metal working and recovery operations. The latter skin or scum produced during the initial polyurethane foam-forming operation, hereinafter sometimes referred to as "natural skin," is generally removed such as by passing the foam containing same through a suitable cutting or severing device such as a band knife or a hot-wire cutter, and the natural skin thus removed is discarded as waste or otherwise treated as scrap foam. The process of the present invention is generally applied to shaped or preformed masses of cured polyurethane foam having fresh foam surfaces characteristic of the foam beneath the natural skin, and prepared by removing any natural skin that might be present thereon such as by passing the mass of foam containing same through a suitable severing device such as a band knife or a hot-wire cutter. However, cured polyurethane foam still containing some or all of the natural skin initially formed thereon may likewise be treated in accordance with the present invention, in which case the natural skin will be substantially or completely converted to the dense skin structure of the present invention. This constitutes a particularly desirable way of "upgrading" the relatively less desirable natural skin product.

In order to indicate still more fully the nature of the present invention the following data showing typical results are set forth, it being understood that this description is presented by way of illustration only and not as limiting the scope of the invention.

The initial cured polyurethane foams employed in the following tests were made from conventional polyurethane foam formulations and were manufactured in per se known manner as described in great detail in the copending Peter Hoppe et al. application Ser. No. 527,106, filed Aug. 8, 1955, now Patent No. 2,764,565, issued Sept. 25, 1956 which is hereby incorporated herein by reference and which therefore need not be further described in the interests of brevity. In particular, detailed working Examples 1 and 2 of that application show how typical cured polyurethane foam products, processed and tested as described hereinafter, are prepared. Slabs of the cured polyurethane foam thus prepared are first passed through a conventional cutting device such as a band knife slitting machine to remove the natural skin and produce a foam presenting natural skin-free surfaces, whereupon smaller shapes are produced therefrom as desired by cutting on the band knife slitting machine or on a hot-wire cutting device.

The following four tables show the conditions and results of various runs by hot press (as in FIG. 5), by hot knife (as in FIG. 2), by hot roll (as in FIG. 3), and by calendar, which is, in effect, three passes through hot rolls (as in FIG. 4).

TABLE II.—SKIN BY HOT PRESS (AS IN FIG. 5)

| Run no. | Pressure Percent comp. | Pressure P.s.i. | Temp., °C. | Time | Percent loss in height to skin, inches | Appearance |
|---|---|---|---|---|---|---|
| 13157-5 | 50 | | 149 | 40 min | 23% or 0.13 | Open cells but light skin. |
| 13157-6 | 90 | | 149 | 15 sec | 22% or 0.2 | Smooth, soft, closed cell, skin. |
| 13158-18 | 90 | | 173 | 1 min | 27% or 0.275 | Same as above. |
| 13158-P | 90 | | 173 | 3 min | 33.4% or 0.25 | Tough, good, closed cell, skin. |
| 13158-W | 90 | | 198 | 2 min | 36.5% or 0.345 | Tough, open cell skin. |
| 13158-AA | | 101 | 202 | 15 sec | 27.5% or 0.261 | Tough, good, slightly open cell, skin. |
| 13158-29 | | 101 | 202 | 5 sec | 27.5% or 0.21 | Smooth, soft, closed cell, skin. |
| 13159-35 | | 201 | 315 | 15 sec. to pump press. | 38% or 0.373 | Tough, soft, closed cell, skin (brown). |
| 13159-AE | | 201 | 315 | 17 sec. to close press. | 54% or 0.516 | Closed, brown, broken skin. |
| 13159-36 | | 301 | 315 | 18 sec. to close press. | 36% or 0.4 | Tough, soft, brown, closed, skin. |

TABLE III.—SKIN BY HOT KNIFE (AS IN FIG. 2)

| Run number | Percent comp. | Temp., °C. | Rate, in./sec. | Appearance |
|---|---|---|---|---|
| 13153-1 | 17 | 350 | 1.4 | Smooth, soft, skin. |
| 13153-3 | 17 | 380 | 2.93 | Thin, smooth, soft, skin. |
| 13153-6 | 17 | 450 | 4.1 | Thin, smooth, soft, skin. |
| 13153-7 | 17 | 430 | 2.28 | Thick, rough, skin. |
| 13153-8 | 19 | 475 | 1.24 | Thick, rough, skin. |
| 13153-11 | 19 | 450 | 5.85 | Very thin skin. |
| 13153-18 | 19 | 325 | 2.08 | Soft, partly closed cell, skin. |
| 13153-20 | 19 | 340 | 0.45 | Very good skin. |
| 13153-23 | 17 | 270 | 0.865 | Soft, thin, skin. |

TABLE IV.—SKIN BY HOT ROLL (AS IN FIG. 3 OR 4)

| Run number | Foam density, lbs./cu. ft. | Hot roll, Temp. °F. | Roll surface speed ratio hot:cold | Nip opening, percent, compression | Rate, ft./min. | Percent height loss to skin | Appearance |
|---|---|---|---|---|---|---|---|
| 121902-6 | 2 | 360 | 1.06:1 | 98 | 1.6 | 40 | Foam broken, surface smooth. |
| 121902-7 | 4 | 380 | 1.06:1 | 96 | 1.6 | | Foam broken, no skin. |
| 121902-8 | 2 | 380 | 1.06:1 | 95 | 1.1 | 5 | Slight skin. |
| 121902-9 | 2 | 387 | 1.06:1 | 95 | 1.6 | 5 | Slight skin. |
| 121902-11 | 2 | 390 | 1.06:1 | 95 | 1.1 | 40 | Smooth skin. |
| 121902-17 | 2 | 420 | 1.06:1 | 95 | 1.1 | 40 | Smooth strong skin. |
| 121902-20 | 4 | 420 | 1.06:1 | 95 | 1.1 | | Foam broken. |
| 121902-21 | 4 | 420 | 1.06:1 | 95 | 6.5 | 5 | Foam broken, slight skin. |
| 121902-23 | 4 | 430 | 1.06:1 | 90 | 3.9 | 10 | Smooth skin. |
| 121902-24 | 4 | 430 | 1.06:1 | 90 | 1.6 | 20 | Smooth skin. |
| 121905-15 | 2 | 405 | 1.06:1 | 99 | 1.2 | 75 | |
| 121902-16 | 2 | 420 | 0.79:1 | 95 | 1.1 | 40 | Smooth strong skin. |
| 121902-18 | 2 | (1) | ²1.06:1 | 95 | 1.6 | 55 | Skin on both sides of foam. |

¹ 420 on both rolls.
² Both rolls hot.

TABLE V.—SKIN BY CALENDER (IN EFFECT, THREE PASSES AS IN FIG. 4)

| Run number | Nip openings, percent compression | | | Hot roll, surface speed ratio, coldroll=1 | | | Roll Temp., °F. | | Rate, ft./min. | Percent height loss to skin | Appearance |
|---|---|---|---|---|---|---|---|---|---|---|---|
| | 1 | 2 | 3 | 1 | 2 | 3 | Hot | Cold | | | |
| 121905-8 | 95 | 97 | 98 | 1.27 | 0.94 | 1 | 420 | 200 | 4 | 25 | Excellent smooth skin. |
| 121905-11 | 92 | 95 | 97 | 1.27 | 0.94 | 1 | 420 | 200 | 1.5 | 30 | Tough smooth skin. |
| 121905-5 | 92 | 95 | 97 | 1.27 | 0.94 | 1 | 420 | 200 | 4 | 20 | Soft skin. |
| 121905-6 | 84 | 90 | 94 | 1.27 | 0.94 | 1 | 420 | 200 | 4 | 15 | Do.³ |
| 121905-7 | 84 | 90 | 94 | 1.27 | 0.94 | 1 | 420 | 200 | | 5 | (¹). |
| 121905-8 | 84 | 90 | 94 | 1.27 | 0.94 | 1 | 420 | 200 | | 10 | (²). |
| 121905-4 | 92 | 95 | 97 | 1.27 | 0.94 | 1 | 420 | 200 | 5.5 | 20 | Soft skin.² |
| 121905-3 | 92 | 95 | 97 | 1.27 | 0.94 | 1 | 420 | 200 | 4 | 20 | Do. |

¹ 1 pass through calender.
² 2 passes through calender.
³ 3 passes through calender.

Samples of untreated cured polyurethane foam and samples of the same foam which had been subjected to heat and pressure by three different methods to produce a controlled dense skin in accordance with the present invention were submitted to physical tests. The following Tables VI and VII explain the preparation and give the data obtained in testing these samples. The particular samples so chosen, by the way, were of relatively thin skins suitable for coating, and were selected as being approximately equivalent in feel or "hand." They were not purposely selected to be of optimum toughness or any other particular property and so these tables make evident the great range of physical properties in sealed cured polyurethane foams which are made available in the practice of the present invention. It will be noted that a sample of the uncontrolled natural skin which is formed during the free-rise foaming process heretofore known was also tested for comparison purposes.

Visual examination shows the three treated surfaces to be tough, smooth, pliable and uniform dense skins. In contrast, the natural skin has pronounced blemishes and crater-like holes therein. While the natural skin is also tough, it is definitely less pliable than the dense skins of cured polyurethane foam as obtained in accordance with the present invention.

Microscopic examination of the various treated surfaces reveal the following information:

The hot knife method causes fusion of the surface with a smearing of fused material into a nearly continuous film. The surface has a glossy appearance. The polyurethane material immediately underneath the dense skin is essentially undisturbed foam. More particularly, and as shown in the accompanying photomicrographs, the cured polyurethane foam surfaced in this manner presents a pleasantly uniform appearance, the skin being thin and showing a fairly sharp line of demarcation from the substrate. The dense skin does not appear to be fully closed but rather still remains somewhat porous. Note the somewhat glazed, coated or wiped-over appearance.

The calender or hot roll method causes a compaction of the foam skeleton gradually fading into undisturbed foam constituting the main mass of foam material. Fusion is least evident and the surface has a matte finish; however, any openings in the surface appear to be closed just beneath the surface of the foam. More specifically,

TABLE VI.—PREPARATION OF TESTED SKINS

| Sample number | Foam no. | Density, lbs./cu. ft. | Surface treatment |
|---|---|---|---|
| 13156-3 | | 2 | Hot knife at 380° C. at 14.8 feet/minute. Blade set at ⅞" for 1" thick foam. |
| 13156-0 | | 2 | No treatment. |
| 13158-Q | 10427-7 | 2 | Pressed at 90% compression for 26 seconds: foam in contact with hot plate at 176° C. for total of 120 seconds. |
| 13158-0 | 10427-7 | 2 | No treatment. |
| 13158-19 | 10427-8 | 4 | Pressed at 90% compression for 51 seconds: foam in contact with hot plate at 176° C. for total of 45 seconds. |
| 13158-0 | 10427-8 | 4 | No treatment. |
| 121905-8 | 11494-13 | 2 | Two passes through four roll calender. Hot roll temperature 420° F. at 4 feet/minute. |
| 10427-7 | 10427-7 | 2 | No treatment—natural. |
| 10427-8 | 10427-8 | 4 | Skin from foaming operations. |

TABLE VII.—PHYSICAL PROPERTIES OF FOAM WITH SKIN TENSILE

| Sample number | Density lbs./cu. ft. | Skin preparation | Strength, p.s.i. | Elongation, percent | Skin strength, p.s.i. | Penetration, lbs. | Air permeability, cu. ft./min. at 3 p.s.i. | Taber abrasion cycles to break | Shore hardness "00" |
|---|---|---|---|---|---|---|---|---|---|
| 13156-0 | 2 | 0 | 18 | 140 | | 0.51 | High | 20-50 | 10 |
| 13156-3 | 2 | Hot knife | 24 | 135 | 570 | 0.96 | 0.0045 | 310 | 50 |
| 10427-7-02 | 2 | 0 | 28 | 415 | | 0.96 | High | 20-50 | 5 |
| 13158-Q | 2 | Hot press | 41 | 375 | 215 | 1.43 | 0.012 | 2,200+ | 35 |
| 10427-7 | 2 | Natural | 48 | 360 | 890 | 1.03 | Zero | 535 | 55 |
| 10427-8-04 | 4 | 0 | 37 | 565 | | 0.90 | High | 20-50 | 10 |
| 13158-19 | 4 | Hot press | 39 | 515 | 75 | 1.25 | 0.0017 | 350 | 30 |
| 10427-8 | 4 | Natural | 45 | 480 | 405 | 1.07 | Zero | 45 | 45 |
| 121905-3 | 2 | Calender | 29 | 350 | | 1.53 | 0.175 | 100 | 30 | by reference to the accompanying photomicrographs, one notes a gradual change from wide open cells on the interior of the mass of cured polyurethane foam to fully compacted cells which are almost completely collapsed at the surface. The dense skin layer as such, however, is very uniform and its appearance indicates residual porosity.

By reference to the accompanying photomicrographs, one notes that the natural skin, on the other hand, is highly cratered and shows a very irregular pattern. It looks thin, dense and non-porous, and shows a very sharp line of demarcation between the natural skin and the main mass of polyurethane foam beneath.

In the case of relatively thin skins it is frequently difficult, and sometimes impossible, to determine the skin thickness with any great degree of accuracy since the thin skin blends into the foam without a true line of demarcation.

With reference again to the physical tests reported in the tables, resistance to penetration was of particular interest because, while the treated samples submitted to test were not purposely selected to be optimum in this respect, they all showed resistance to penetration in excess of the untreated foam and were even better than the tested samples of natural skin. The test consisted of forcing a pointed probe through the skin and foam, simulating a pencil being pushed through the surface of a crash pad or seat. The test is roughly equivalent to ASTM D876–52T. The probe was ⅛″ in diameter with a conical point ground to a 0.020″ diameter flat, the load required for penetration being measured on an Instron machine.

Resistance to abrasion was measured with a Tabor Abrader, which is described in ASTM D1175–51T. Control samples of untreated foam show essentially no resistance to abrasion under the rigorous conditions selected, while the foam surface obtained in accordance with the present invention was in one case so strong that the test was abandoned before failure occurred. The heat- and pressure-treated surfaces obtained in accordance with the present invention have from 5- to 8-fold superiority over the naturally formed skin, although here again it is emphasized that the various samples were selected at random and not with special regard to their optimum properties in this respect merely for test purposes.

Investigation of air permeability properties shows that the surface treatment of cured polyurethane foam in accordance with the present invention permits rather close control of the permeability of the treated foam surface over a wide range of conditions. The air permeability of cured polyurethane foam is very high while that of naturally formed skin is zero. On the other hand it is possible, by suitably selecting the conditions of temperature, pressure and time, to control the air permeability of sealed cured polyurethane foam prepared in accordance with the present invention over wide ranges. Thus, even though the surface of the sealed cured polyurethane foam is essentially closed and will permit an additional coating composition to be smoothly applied thereover, nevertheless there is a residual permeability which allows at least a slight absorption of the additional coating material thus substantially improving the adhesion thereof. This feature is of substantial advantage in cases where it is desired to apply protective and/or decorative coatings to the sealed cured polyurethane foams obtained in accordance with the present invention. For example, among the many applications in which a strong dense skin which however does not completely sacrifice air permeability is a desideratum are wearing apparel, seating or cushioning material, shoe components, and carpet underlay where some ability to suck air through the surface of the treated foam will facilitate vacuum cleaning of the carpet.

The data tabulated above show a considerable increase in tensile strength over the untreated foam in the case of relatively soft, dense skin, sealed, cured polyurethane foams.

As has been indicated above, the present invention may be applied to cured polyurethane foams of all kinds without reference to their specific formulations or methods of preparation in the first instance. Since the present invention does not relate in any way to the initial preparation of the polyurethane foams, it is deemed suffient to make only a few general observations thereon in order to fix the background or environment in which the present invention finds its utility. As is well known in the art, the manufacture of polyurethane foams involves a polyaddition reaction between organic polyisocyanates and organic polyesters and/or polyethers. A rather substantial volume of literature has developed in the past ten years or so in connection with the production of polyurethane plastics in general and polyurethane foams in particular, of which among the earliest is a book entitled "German Plastics Practice," by DeBell et al. (1946)—see pages 316 and 463–465. Numerous patents in this art include Hill Patent No. 2,726,219, Simon and Thomas Patents Nos. 2,577,279, 2,577,281 and 2,642,403 as well as many others that could be cited as exemplary of this rapidly growing art, and including references to rigid, semi-rigid, and flexible foams to all of which the present invention is applicable. However, in order to provide sufficient detail with respect to specific starting materials that are especially useful for treatment in accordance with the present invention and at the same time achieve a certain degree of brevity herein, reference is made to the aforesaid Peter Hoppe et al. application Ser. No. 527,106, filed Aug. 8, 1955, now Patent No. 2,764,565, issued Sept. 25, 1956, the disclosure of which is hereby incorporated herein by reference. This Hoppe et al. patent has been reissued as Reissue No. 24,514.

I claim:

1. Method of forming a smooth substantially impervious skin on the surface of resilient sheet foamed plastic, comprising passing the sheet through the nip of differentially driven rollers, at least one of which is heated, to produce a wiping action to the surface of the compressed foam while superficially melting the same.

2. Method of forming a smooth substantially impervious skin on the surface of resilient sheet foamed plastic, comprising passing the sheet through the nip of differentially driven rollers, at least one of which is heated, to produce a compacting action to the surface of the compressed foam while superficially melting the same.

3. Method of forming a smooth substantially impervious skin on the surface of resilient sheet foamed plastic, comprising passing the sheet through the nip of differentially driven rollers, at least one of which is heated.

4. Method of forming a smooth substantially impervious skin on the surface of resilient sheet foamed plastic, comprising passing the sheet through the nip of differentially driven rollers, at least one of which is heated, while superficially melting the compressed foam.

5. A process for producing a sealed cured polyurethane foam having a dense after-formed skin of substantial thickness which comprises subjecting to a wiping action at least one surface of a sheet of cured preformed polyurethane foam by passing same in contact with a heated metal surface at elevated temperatures and elevated pressures, the conditions of temperature and pressure and time of treatment being such that no appreciable decomposition of the polyurethane material occurs but being sufficiently drastic to cause at least viscous or plastic flow of the polyurethane material in at least the outermost layer of the surface of the preformed polyurethane foam undergoing treatment and to bring about a heat- and pressure-consolidation of the flowing polyurethane material into said dense after-formed skin characterized by a more compacted pore structure than that of the substrate, the clearance under the heated metal surface being smaller than the thickness of the sheet of cured preformed polyurethane foam undergoing treatment and thereby bringing about a wiping action, the heated foam-contacting metal surface being maintained in the range of about 260° to 480° C. and the foam being passed in contact therewith while compressed by about 15–20% and at a rate of about 1 to 20 feet per minute.

6. A process for producing a sealed cured polyurethane foam having a dense after-formed skin of substantial thickness which comprises subjecting at least one surface of cured preformed polyurethane foam to contact with a heated metal surface at temperatures in the range of about 150° to 500° C. and elevated pressures, the conditions of temperature and pressure and time of treatment being such that no appreciable decomposition of the polyurethane material occurs but being sufficiently drastic to cause at least viscous or plastic flow of the polyurethane material in at least the outermost layer of the surface of the preformed polyurethane foam undergoing treatment and to bring about a heat- and pressure-consolidation of the flowing polyurethane material into said dense after-formed skin characterized by a more compacted pore structure than that of the substrate, the heated metal surface being defined by a plurality of pairs of metal rolls at least one of each pair being heated, the nip between successive pairs of rolls being successively smaller in the direction of movement of the cured preformed polyurethane foam undergoing treatment.

References Cited

UNITED STATES PATENTS

| | | | |
|---|---|---|---|
| 2,009,984 | 7/1935 | Billner | 264—321 XR |
| 2,071,647 | 2/1937 | Miller | 264—321 XR |
| 2,384,387 | 9/1945 | Meyer | 264—321 |
| 2,681,377 | 6/1954 | Smithers | 264—321 XR |
| 2,867,222 | 1/1959 | Otto et al. | 264—321 XR |
| 2,878,153 | 3/1959 | Hacklander | 264—321 XR |

FOREIGN PATENTS

| | | |
|---|---|---|
| 707,818 | 4/1954 | Great Britain. |

OTHER REFERENCES

DeBell, John M.: German Plastics Practice, Springfield, Mass., DeBell and Richardson, 1946, pp. 463–465.

PHILIP E. ANDERSON, *Primary Examiner.*

U.S. Cl. X.R.

18—5, 19; 156—78; 161—160, 161; 264—54, 323, 327

PO-1050
(5/69)

UNITED STATES PATENT OFFICE
CERTIFICATE OF CORRECTION

Patent No. 3,443,007        Dated May 6, 1969

Inventor(s) Edgar E. Hardy

It is certified that error appears in the above-identified patent and that said Letters Patent are hereby corrected as shown below:

Column 8, Table 1, line 2, under Percent elongation, change "125-110" to -- 125-140 --.

Column 12, Table VII, in the title omit "TENSILE" and instead insert -- TENSILE -- as a subheading immediately above and bracketing the 4th, 5th and 6th columns of the table.

SIGNED AND
SEALED
NOV 17 1970

(SEAL)
Attest:

Edward M. Fletcher, Jr.
Attesting Officer

WILLIAM E. SCHUYLER, JR.
Commissioner of Patents